(12) United States Patent
Sasse

(10) Patent No.: US 6,394,243 B1
(45) Date of Patent: May 28, 2002

(54) CLUTCH DEVICE, PARTICULARLY A STARTING ELEMENT WITH ADJUSTABLE CLUTCH COOLING FOR HIGH POWER LOSS

(75) Inventor: Christoph Sasse, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/551,672

(22) Filed: Apr. 20, 2000

(30) Foreign Application Priority Data

Apr. 20, 1999 (DE) .......................................... 199 17 893

(51) Int. Cl.⁷ ................................................. F16H 45/02
(52) U.S. Cl. .............. 192/3.29; 197/70.12; 197/113.34; 197/113.35
(58) Field of Search .................. 192/3.29, 3.3, 192/70.12, 113.34, 113.35

(56) References Cited

U.S. PATENT DOCUMENTS

| | | | | |
|---|---|---|---|---|
| 5,400,884 A | * | 3/1995 | Matsuoka | 192/3.25 |
| 5,964,329 A | * | 10/1999 | Kawaguchi et al. | 192/3.3 |
| 6,016,894 A | * | 1/2000 | Kundermann | 192/3.3 |
| 6,155,392 A | * | 12/2000 | Kundermann | 192/3.3 |
| 6,012,558 A1 | * | 1/2001 | Kundermann | 192/3.29 |

FOREIGN PATENT DOCUMENTS

| | | | |
|---|---|---|---|
| DE | 44 23 640 | 6/1995 | |
| DE | 198 28 709 | 8/1999 | |
| FR | 23 41 791 | 9/1977 | |
| JP | 5-79560 A | * 3/1993 | .................. 192/3.3 |

OTHER PUBLICATIONS

Article published in VM Berichite NR in 1995, entitled "Aufbau und Steuerung einer schlupfgeregelten Überbrückungskupplung im hydrodynamischen Drehmomentwandler" written by L. Hein, et al., pp. 319–337.

* cited by examiner

Primary Examiner—Richard M. Lorence
(74) Attorney, Agent, or Firm—Cohen, Pontani, Lieberman & Pavane

(57) ABSTRACT

A clutch device within whose housing a first fluid chamber and a second fluid chamber are separated by a piston which is movable by a fluid pressure differential between the fluid chambers. The piston serves to actuate a friction clutch whose friction surfaces are arranged in the first fluid chamber. Fluid can be guided through the first fluid chamber independent from the fluid pressure in the second fluid chamber in order to conduct frictional heat away from the friction clutch and its friction surfaces. For this purpose, fluid passages through which fluid allocated to the first fluid chamber can flow are allocated to the friction surfaces. It is proposed that there is a minimum fluid quantity which flows through the fluid passages and the quantity of fluid flowing through the first fluid chamber is adjustable by means of this minimum fluid quantity, for which purpose the minimum fluid quantity is in a fixed relationship with the amount of fluid introduced into the first fluid chamber and removed from the first fluid chamber.

20 Claims, 3 Drawing Sheets

CLUTCH DEVICE, PARTICULARLY A STARTING ELEMENT WITH ADJUSTABLE CLUTCH COOLING FOR HIGH POWER LOSS

BACKGROUND OF THE INVENTION

1. Field of the Invention

The present invention relates to a clutch device with a housing containing a first fluid chamber and a second fluid chamber and with a piston of a friction clutch. The piston separates the first fluid chamber from the second fluid chamber and is axially movable with respect to a housing axis. The friction clutch can be actuated by applying a pressure difference in the fluid between the first fluid chamber and the second fluid chamber. The friction surfaces of the friction clutch are arranged in the first fluid chamber. Fluid can be supplied to the first fluid chamber and fluid can be removed from the first fluid chamber independent from the fluid pressure in the second fluid chamber in order to conduct frictional heat away from the friction clutch and its friction surfaces. Fluid passages through which fluid allocated to the first fluid chamber can flow are allocated to the friction surfaces.

2. Discussion of the Prior Art

One application of a clutch device of the type mentioned above in automobile engineering consists, for example, in that when starting by means of the clutch device a driven element, for example, the input shaft of a shift transmission, is brought as far as possible to the same speed as a drive unit, for example, an internal combustion engine. Depending on the driving torque that can be applied by the drive unit, substantial power losses occur in the clutch device, which can be designated in this connection as a "starting element". In extreme cases, these power losses can correspond to the maximum engine output. The starting element should be able to resist such power losses even in extreme situations, for instance, when starting on a hill, specifically, with as little wear as possible over the life of the starting element.

According to a known solution, the starting element is formed by a torque converter with a frictional lockup clutch which is arranged in a drivetrain of the motor vehicle between a drive unit (internal combustion engine) and an automatic transmission and frequently has an integrated torsional vibration damper. A torque converter is extremely advantageous in many respects because it is suitable for high torques and, beyond this, can multiply torques. However, this is a comparatively complicated solution, particularly with respect to construction, since the torque converter has three parts (impeller, turbine, stator) which are rotatable relative to one another. Further, a fluid cooler (oil cooler, especially transmission cooler) associated with the torque converter must be constructed for comparatively large flows of fluid. Further, the starting behavior of the system is not alterable, which would be advantageous for optimizing the system with respect to cold starting, selecting between sports-style starting or comfortable starting, etc.

Another known solution consists in a wet clutch forming an integral component part of an automatic transmission; while this clutch can be regulated with respect to torque transmission, it is not capable of withstanding high power losses (at high engine outputs) as well, in contrast to the hydrodynamic torque converter. Further, in clutches of this kind which are integrated in the transmission relatively high friction losses occur as a result of the wet operation (Plansch operation) resulting in a correspondingly higher consumption of fuel (gasoline consumption).

Further, there also exist hydraulic clutches, or hydroclutches, as they are called, with an integrated lockup clutch which have a hydraulic circuit with an impeller wheel and a turbine wheel but without a stator wheel (and consequently without torque multiplication. Hydroclutches of this type only operate fairly economically when the hydraulic circuit is utilized only for starting and when the lockup clutch which is constructed as a friction clutch is closed as quickly as possible.

For examples of a hydroclutch and a torque converter, each with an integrated lockup clutch formed as a friction clutch, reference may be had to German Patent Application 198 28 709.7 (not yet laid open to public inspection) and DE 44 23 640 A1 which share the common feature that the clutch device is controllable via a two-line system in which an engagement state of the lockup clutch and a fluid flow through the clutch device are not adjustable independently from one another. FR 2 341 791 A1 discloses a torque converter with a lockup clutch which may be controllable via a three-line system with adjustment of an engagement state of the lockup clutch independent from adjustment of fluid flow through the converter and in which a laminated stack of the friction clutch is arranged in a fluid chamber containing a turbine wheel, a stator wheel and an impeller wheel.

A torque converter of the type mentioned above attributed to the Mercedes-Benz company is known from a German Engineers Association report entitled "Construction and Control of Slip-regulated Lockup Clutch in a Hydrodynamic Torque Converter [Aufbau und Steuerung einer schlupfgeregelten Überbrückungskupplung im hydrodynamischen Drehmomentwandler]", L. Hein, et. al, (VDI-Berichte No. 1175, 1995, pages 319–337). The torque converter is controllable by means of a three-line system in such a way that a fluid flow through the first fluid chamber is adjustable independently from the fluid pressure in the second fluid chamber and is accordingly adjustable independently from the engagement state or disengagement state of the friction clutch. The friction clutch of the known torque converter has a laminated stack which is arranged in the first fluid chamber and through which oil flows in an intensive manner according to information contained in the above-cited reference in order to ensure that the removal of heat from the clutch which is designed for continuous slip is good even during high transmission torques. This reference does not indicate how the claimed intensive flow of oil through the laminated stack is ensured. It appears that the flow of oil through the laminated stack depends primarily on the fluid flow forming in the first fluid chamber rather than on the supply of fluid to and removal of fluid from the first fluid chamber, since neither the report nor the drawings contained therein refers to means for positive guidance of the fluid which ensure that a determined amount of fluid having a defined relationship to the amount of fluid introduced into or removed from the first fluid chamber flows through the laminated stack when a fluid circuit is produced through the first chamber by supplying an amount of fluid to the first fluid chamber and removing a corresponding amount of fluid from the first fluid chamber.

As was found in an examination of an actual design by the Mercedes-Benz company which was familiar to experts in this technical field and which essentially corresponds to the torque converter described in the article, the Mercedes-Benz converter is provided with an oil circulation through the first fluid chamber in the following way: The oil delivered by a pump is supplied through an annular channel between a pump hub and a stator support and is fed from there between the stator wheel and the impeller shell into the first fluid chamber. Inside the converter, the supplied oil flows primarily radially outward under the influence of centrifugal force. However, because of slits in the turbine wheel, oil can also flow in the axial direction to an outlet point between the turbine hub and stator wheel, the oil being drawn off from there through an annular channel between the stator support and the driven shaft.

Oil which is pressed outward in the radial direction by centrifugal force can flow radially inward again between the house and the rear of the turbine wheel; it then strikes the laminated stack and flows partly through a gap between an outer lamination or disk carrier and the turbine wheel past the laminated stack and partly (about 10% by rough approximation) through the laminations of the laminated stack.

Before reaching the outlet point between the turbine hub and the stator wheel, the oil flowing through the laminations rejoins the oil flowing through the gap between the outer lamination carrier and the turbine wheel past the laminated stack and also rejoins any oil flowing in the axial direction through the slits in the turbine wheel before it can flow off from the first fluid chamber via the outlet point between the turbine hub and stator. In principle, it is not to be ruled out that a portion of the oil flowing through the laminated stack flows in the axial direction through the above-mentioned turbine wheel slits to the other side of the turbine wheel, where it is pushed radially outward again by the influence of centrifugal force.

Accordingly, the amount of oil flowing through the laminated stack per reference time interval depends primarily on the oil flow developing in the first fluid chamber and depends on the oil supply to the first fluid chamber and on the oil flow out of the first fluid chamber only insofar as this affects the oil flow which develops in the first fluid chamber and which depends on the operating state (rotating state) of the torque converter. Accordingly, a minimum oil quantity flowing through the laminated stack cannot be adjusted by means of a fluid circulation guided through the first fluid chamber.

SUMMARY OF THE INVENTION

Accordingly, it is the object of the present invention to provide a clutch device of the type mentioned above in which a defined minimum cooling of the friction clutch and its friction surfaces can be adjusted in view of high power losses.

This object is met, according to the invention, in that when a fluid circulation is produced through the first fluid chamber by feeding an amount of fluid into the first fluid chamber and letting a corresponding amount of fluid out of the first fluid chamber, a minimum amount of fluid flows through the fluid passages allocated to the friction surfaces, which fluid passages are in a fixed relationship with the amount of fluid introduced into and removed from the first fluid chamber. Therefore, according to the invention, it is possible to adjust a minimum fluid quantity flowing through the fluid passages and therefore a minimum cooling of the friction surfaces by means of the fluid circulation guided through the first fluid chamber, that is, the fluid quantity flowing through the first fluid chamber. This can be achieved in that at least a partial fluid circulation flows through the fluid passages, for which purpose corresponding fluid guiding means and/or distribution means can be provided which force the partial circulation flowing through the fluid passages. If there is more than one flow path for the fluid flowing through the first fluid chamber, wherein, in addition to the at least one flow path through the fluid passages, there is at least one that does not lead through the fluid passages, fluid distribution means can be provided, for example, in the form of different through-flow resistances of the fluid flow paths which adjust the fixed relationship between the total fluid quantity flowing through the first fluid chamber and the minimum fluid quantity.

According to the invention, it is possible to provide, in accordance with requirements, a cooling of the friction surfaces, possibly the laminations or disks, of the friction clutch, namely, irrespective of the actuation of the friction clutch by means of the piston. The controlling of the clutch device can be carried out for this purpose by means of a three-line system, as it is called, in which fluid can be supplied to the first fluid chamber via a first fluid line and can be removed from the first fluid chamber via a second fluid line in order to produce the fluid circulation and in which a fluid pressure which is higher or lower relative to a fluid pressure in the first fluid chamber can be applied via a third fluid line in the second fluid chamber in order to actuate the friction clutch.

According to the invention, it is possible to control the friction clutch extensively independently from the control of the first fluid chamber for forming the fluid circulation, so that it is possible to adapt the cooling volume flow to the requirements for the respective operating conditions without substantially influencing the transmission of torque of the friction clutch. This does not mean that a slight readjustment of the fluid pressure applied to the second fluid chamber would not be required in case of a change in the cooling volume flow through the first fluid chamber insofar as the change in the cooling volume flow is not required anyway by the fact that the cooling volume flow through the first fluid chamber is to be adapted to a change in the actuating state of the friction clutch, particularly to a change in the power loss occurring in the friction clutch. On the other hand, if the fluid pressure applied to the second fluid chamber is changed in order to adjust the actuation state of the friction clutch, the fluid circulation through the first fluid chamber is, as a rule, influenced insignificantly at most. Depending on the power loss which then occurs in the friction clutch, the cooling volume flow through the first fluid chamber can then be reduced or it should be increased, for example, in case of a greater slip for conducting off the increased heat loss.

Since a minimum fluid quantity which is adjustable via the fluid circulation and which cools the friction surfaces and possibly laminations is ensured according to the invention, overheated states of the friction clutch can be reliably prevented even in the event of atypical flow conditions in the first fluid chamber, so that high operating reliability and an increased service life of the friction clutch and consequently a long life of the clutch device is achieved. For this purpose, it is suggested by way of a further development that the minimum fluid quantity is 30%, preferably 50%, more preferably 70%, and most preferably 90% of the fluid quantity supplied to or removed from the first fluid chamber. The expression "minimum fluid quantity" employed herein allows that the fluid quantity actually flowing through the fluid passages is greater than the fluid quantity supplied to and removed from the first fluid chamber depending, for example, on flow conditions that are adjusted in the first fluid chamber and that assist in the flow of fluid through the fluid passages. It is particularly preferable that the fluid circulation passes completely or almost completely through the fluid passages, so that it is ensured that 100% or almost 100% of the fluid flowing through the first fluid chamber flows through the fluid passages.

Depending on the design of the clutch device with regard to the removal of frictional heat from the friction clutch and from the friction surfaces, that is, depending particularly on the configuration and number of fluid passages and the maximum cooling volume flow which can be guided through the latter, very high heat losses can be conducted away from the friction clutch and its friction surfaces, so that very high power losses (for example, 4 kW in continuous slip operation) and extremely high peak loss outputs (for example, up to 10 kW temporarily) can be realized.

The fluid passages can be provided between friction surfaces that can be brought into frictional engagement with one another and/or in at least one friction element having at least one of the friction surfaces. Compared with a more indirect cooling of the friction surfaces by guiding off heat via laminated carriers or the like, this construction of the clutch device ensures that the friction heat formed during the frictional engagement of the friction surfaces is guided off in a particularly effective manner.

A preferred embodiment is characterized in that the fluid passages are connected in parallel, so that fluid of essentially the same temperature is supplied to the fluid passages and substantially identical cooling conditions therefore exist for all friction surfaces. However, it is also possible to provide at least two groups of fluid passages which are connected in parallel within a group and which are connected in series from one group to another. In this case, the fluid that would flow through a group of fluid passages located downstream in the direction of flow would possibly already be heated by the frictional heat which it absorbed when flowing through preceding fluid passages beforehand. However, by providing a sufficiently large minimum fluid quantity per reference time interval, a sufficient cooling can be achieved for all friction surfaces.

With regard to the connection of fluid passage groups one after the other in series, it may be that fluid passages allocated to different friction surface pairs belong to different groups. For example, fluid passages are allocated to friction surfaces arranged on opposite sides of a friction element can belong to one group. An example of fluid passages of this kind is channels in a lamination or disk of the friction clutch which are allocated to the friction surfaces on both sides of the lamination. Further, it is possible that fluid passages which are associated with friction surfaces that can be brought into a frictional engagement with one another belong to one group. An example for fluid passages of this kind is friction facing grooves which are associated with the friction surface having the friction facing grooves and with the friction surface which can be brought into frictional engagement with the latter and which are also open to allow fluid to flow through when friction surfaces are in frictional engagement with one another. With respect to possible embodiment forms of the channels and friction facing grooves and generally of fluid passages mentioned by way of example, reference is had to embodiment examples of the above-cited DE 44 23 640 A1 having different fluid passages of the types mentioned above.

It was already stated that at least a part of the fluid passages can be formed by friction facing grooves. Further, alternatively or in addition, at least a part of the fluid passages can be formed by grooves in at least one lamination of the friction clutch. Further, as was already stated, at least a part of the fluid passages can be formed by channels in laminations of the friction clutch which preferably have at least one smooth friction surface. As expressed herein, the channels are contrasted with the grooves in that the channels are closed in the direction transverse to the through-flow direction, that is, toward the associated friction surfaces, whereas grooves are open toward one of the associated friction surfaces in the direction transverse to the through-flow direction.

Since, as was stated, the fluid circulation through the first fluid chamber is essentially independent from the control of the friction clutch via the second fluid chamber, the geometry of the fluid passages, possibly the groove geometry and a setting (shrinkage caused by surface pressing) influencing the groove geometry or wear of the friction facings influencing the groove geometry are appreciably less critical for the operating behavior of the clutch device, especially in consideration of the cooling fluid flow through the fluid passages.

A preferred embodiment of the clutch device is characterized in that a torque transmission wheel which is mounted so as to be rotatable relative to the housing is provided in the first fluid chamber and is in a torque-transmitting connection with a torque transmission shaft and can be coupled with the housing via the friction clutch in order to produce a torque transmission connection between a drive side and a driven side of the clutch device. The first fluid chamber is preferably essentially completely filled with fluid which, in accordance with the operating state of the clutch device, is entrained by the housing and the torque transmission wheel in the rotating direction of the latter, so that substantially reduced friction losses result compared, e.g., to a Plansch operation of friction clutches integrated in a transmission. Also, the second fluid chamber is preferably essentially completely filled with fluid to prevent friction losses. The housing preferably serves as a drive side and the torque transmission shaft preferably serves as a driven side of the clutch device; the torque transmission wheel can then advisably be designated as a driven wheel and the torque transmission shaft can then be designated as a driven shaft.

The torque transmission wheel, possibly the driven wheel, can have a lamination carrying portion for at least one lamination, especially an inner lamination or outer lamination, of the friction clutch. Further, it is possible for a torsional vibration damper arrangement to be integrated in the torque transmission wheel, possibly the driven wheel, for example, with a sliding block wide-angle damper, as it is called, such as is known from DE 198 28 709.7 or in connection with dual-mass flywheel constructions by the present Applicant.

There are different possibilities for providing the minimum fluid quantity flowing through the fluid passages when the fluid circulation is produced. According to one solution, the torque transmission wheel divides the first fluid chamber into two fluid chamber areas which communicate via the fluid passages so as to allow fluid flow, and, when the fluid circulation is produced, one of the fluid chamber areas serves as a fluid supply area supplying fluid to the fluid passages and the other serves as a fluid outlet area which guides fluid out of the fluid passages. The two fluid chamber areas preferably communicate in a flow connection principally or essentially solely through the fluid passages (aside from some kind of fluid flow connection via an associated fluid supply such as a fluid pump with a fluid reservoir) and can be connected in a manner known per se via axially extending fluid channels (for example, annular channels between shafts of the clutch device) to a fluid supply.

If the torque transmission wheel has a torsional vibration damper arrangement, appropriate seals should be provided in the area of the torsional vibration damper arrangement to prevent flows of fluid between the two fluid chamber areas which would bridge the fluid passages. In this connection, it is highly advisable when a damper cage of the torsional vibration damper having at least one torsional spring element is constructed as a substantially closed cage.

According to a further solution for providing the fluid flow according to the invention through the fluid passages, an intermediate wall is provided in the first fluid chamber, possibly adjacent to the torque transmission wheel, which intermediate wall (possibly in cooperation with one or more other components of the clutch device) divides the first fluid chamber into two fluid chamber areas which communicate via the fluid passages so as to permit a flow of fluid, and, when the fluid circulation is produced, one of the fluid chamber areas serves as a fluid supply area supplying fluid to the fluid passages and the other serves as a fluid outlet area which guides fluid out of the fluid passages. The intermediate wall can be connected with the housing so as to be fixed with respect to rotation relative to it and/or can be axially secured to the housing and preferably has at least one friction surface of the friction clutch. The two fluid chamber areas (aside from any fluid flow connection via the associated fluid supply) are preferably in a fluid flow connection chiefly or substantially exclusively via the fluid passages.

According to another solution for achieving the flow through the fluid passages according to the invention, the housing has a fluid channel arrangement by which, in order to produce the fluid circulation, fluid can be supplied to an area of the first fluid chamber located radially outside of the friction surfaces or by which fluid can be conducted away from this area in order to provide a fluid flow of the fluid circulation passing through an area of the first fluid chamber located radially inside of the friction surfaces, through the fluid passages, through the area of the first fluid chamber located radially outside of the friction surfaces, and through the fluid channel arrangement.

In order to achieve the largest possible fluid flow through the fluid passages, a connection area between a lamination of the friction clutch and an associated lamination carrier, especially a toothing of the lamination with the lamination carrier, can be protected against a substantial flow of fluid by-passing the fluid passages. For this purpose, it is suggested as a particularly simple and therefore economical (and nevertheless reliable) step for securing that at least one sealing ring is arranged between two laminations or between a lamination and a surface of the housing or piston located opposite to the lamination.

In connection with the construction of the torque transmission wheel with a lamination carrying portion, it is suggested in a further development that a lamination is arranged at the lamination carrying portion so as to be fixed with respect to axial displacement, preferably in such a way that the connection area between the lamination and the lamination carrying portion is protected against a substantial flow of fluid by-passing the fluid passages. In this connection, it is also extremely advantageous when a hub of the torque transmission wheel in the housing has play for axial displacement on the torque transmission shaft. Axial bearings located on the radial inside can be omitted in this case because an axial positioning is achieved by means of the lamination which is fixed with respect to axial displacement at the lamination carrying portion. All of this results in advantages with respect to cost and savings in axial installation space which can be made available for the fluid circulation for radial through-flow with a large effective flow cross section.

The clutch device according to the invention can be constructed in such a way that, apart from the friction clutch, it has essentially no additional torque transmission connection between a drive side (possibly the housing) and a driven side (possibly the driven shaft with the driven wheel) of the clutch device. In this case, the torque transmitted by the clutch device can be adjustable via an appropriate actuation of the friction clutch, possibly by adjusting a defined slip. In any case, a controllable or regulatable slip can be dispensed with in a torsional vibration damper arrangement.

However, the clutch device can have, in addition to the friction clutch, a hydrodynamic circuit as a further torque transmission connection between a drive side (possibly housing) and a driven side (possibly driven shaft with driven wheel) of the clutch device. In this case, the torque transmission wheel (driven wheel) can be allocated as a turbine wheel, or a separate turbine wheel, which forms the hydrodynamic circuit together with an impeller wheel possibly formed by a housing portion and, as the case may be, with a stator wheel. Accordingly, the clutch device can also be a torque converter (construction of the hydrodynamic circuit with stator wheel) or a hydroclutch (construction of hydrodynamic circuit without stator wheel) which does not enable torque amplification, wherein the friction clutch serves as a lockup clutch in both cases. Also, in the case of the torque converter or hydroclutch, the slip of the lockup clutch can be controllable, for example, in order to dispense with a separate torsional vibration damper or a torsional vibration damper integrated in the clutch device.

A construction with the intermediate wall, already mentioned, is especially advisable for the clutch device with hydrodynamic circuit. The intermediate wall can be arranged axially between the torque transmission wheel (particularly the driven wheel) and the piston. It is especially preferable that the turbine wheel itself serves as driven wheel.

In a further development, it is suggested that the intermediate wall is connected in a radial inner area with a radial inner housing portion, possibly with a supporting ring or housing hub, for common rotation with the housing so as to be fixed with respect to rotation relative to it and is preferably fixedly connected axially, wherein a fluid channel arrangement is provided in the housing portion and/or between the housing portion and the intermediate wall and/or in a hub portion of the intermediate wall, wherein, via this fluid channel arrangement, a fluid chamber area of the two fluid chamber areas which is defined by the piston and the intermediate wall and which preferably serves as a fluid inlet area is connected to or can be connected to an axially extending fluid channel arrangement which is connected to or can be connected to a fluid source or a fluid reservoir.

The intermediate wall can have a radially outer circumference at a radial distance from a radially outer circumferential wall portion of the housing. In this respect, at least one driven-side lamination arranged axially between the piston and the intermediate wall can be held in a radial area of the first fluid chamber between the outer circumference and the circumferential wall portion in a torque transmission connection with the driven side of the clutch device, possibly by means of at least one lamination carrying portion of the torque transmission wheel, possibly the turbine wheel.

The piston can extend radially up to the circumferential wall portion of the housing and can be guided at that location in a sealed manner. In this way, a particularly large effective surface of the piston is offered to the fluid in the second fluid chamber and consequently a particularly high transmission capability of the friction clutch can be achieved.

It has already been mentioned that the fluid chamber area which is defined by the intermediate wall and the piston (possibly in cooperation with at least one further component of the clutch device) can serve as a fluid inlet area. This has the effect that the oil supplied to the first fluid chamber flows through the fluid passages in the cool state (possibly proceeding from a transmission cooling unit) and only then does it flow through the hydrodynamic circuit, which likewise heats the oil, into the other fluid chamber area serving as fluid outlet area, so that the cooling of the friction clutch and its friction surfaces is particularly effective. The disadvantage caused by this flow direction, namely, that a suction action of the impeller wheel cannot be utilized and must be pumped to a certain extent against the suction action of the impeller wheel, can certainly be tolerated to gain the advantage mentioned above. If desired, an opposite fluid flow direction can also be provided through the first fluid chamber, for example, in order to utilize the suction action of the impeller wheel for producing the fluid circuit through the first fluid chamber.

It should already have been made clear that, according to the invention, the piston of the friction clutch is controllable independently from the fluid flow through the first fluid chamber, wherein the friction clutch can have the following operating states: open (disengaged), slipping and completely engaged (fully engaged lockup). For this purpose, the clutch device can be controllable via a three-line system, as it is called. Due to the fact that the piston is controlled independently from the fluid circuit through the first fluid chamber, it is possible to adjust the fluid flow through the first fluid chamber in the open and slipping state of the friction clutch (lockup clutch, possibly converter clutch) corresponding to the power loss resulting from the engaged state of the clutch (engine torque modified by slip speed). When the friction clutch is completely engaged (zero slip speed), the fluid circuit through the first fluid chamber can and should be interrupted in order to minimize the losses through an associated fluid pump, possibly transmission pump.

A slip operation of the friction clutch, possibly a lockup clutch or converter clutch, is useful in different respects. Accordingly, a slipping friction clutch in which a differential speed occurs between a drive side and a driven side of the clutch device can be used to decouple the driven side from the drive side for torsional vibrations of a drive unit, that is, to damp torsional vibrations, wherein fluctuations in both torque and moment are suppressed or damped. Accordingly, a torsional vibration damper arrangement with torsional damper springs can be dispensed with in some cases. This applies to a clutch device with a hydrodynamic circuit as well as to a clutch device without hydrodynamic circuit.

In the case of a clutch device with a hydrodynamic circuit, especially in the case of a torque converter, a torque which is supportable by the clutch device can be increased relative to the torque that is supportable by a pump or an impeller alone by means of the slipping lockup clutch. For example, a converter having a so-called "soft characteristic" can be made "hard" by the slipping converter clutch in that the lockup clutch supports an additional torque of the engine or the like aside form the torque supported by the impeller. Depending on the torque that can be exerted by an engine, a so-called soft characteristic could be present, for example, when the impeller wheel can support approximately 80 Nm at a speed of 2000 RPM. When the engine can exert an appreciably greater torque, "howling" occurs in the engine, e.g., when starting, until a speed is reached at which the torque that can be applied by the engine can be supported by the torque converter. A howling of the engine enables a fast rise of the torque transmitted to the transmission, but results in increased gasoline consumption. In the case of a converter with a so-called "hard characteristic" in which the pump can support 200 Nm, for example, at a speed of 2000 RPM, the speed for supporting the engine torque would rise only to a noticeably small degree if at all, resulting in a more economical and comfort-oriented driving style. As a result of the slipping lockup clutch, a converter which is "soft", per se, due to the design of the hydrodynamic circuit can be made "hard", wherein the torque which can be supported for a reference speed of the converter can be adjusted by adjusting the engagement state of the friction clutch, that is, by adjusting the torque which is transmitted by the friction clutch and which bypasses the hydrodynamic circuit. Therefore, both sporty driving and economical comfort-oriented driving are made possible, as desired, by means of the same drivetrain.

As was already mentioned, because of the good cooling capability provided according to the invention for the friction surfaces with adjustment of a minimum fluid quantity, especially high power losses of the friction clutch can be realized in the case of a torque converter of the converter clutch or lockup clutch. In this connection, the above-mentioned power losses of 4 kW in continuous slip operation and 10 kW in case of peak loads may be sufficient in practice, in any case when assuming a typical power loss of the hydrodynamic circuit in the non-bypassed state in the amount of about 10 kW to 15 kW. The magnitude of power loss for which the friction clutch (lockup clutch) is to be designed is determined by the engine torque to be transmitted and the maximum slip speed in continuous slip operation, wherein an increased power loss can be caused by an engine with a higher torque and/or by an increased slip speed (for greater damping of torsional vibrations and/or for modification of the characteristic of the converter). For example, at an engine torque of 200 Nm and a slip speed of 100 RPM, there is a power loss of 2 kW which is to be guided off from the friction clutch and its friction surfaces primarily through the fluid circuit through the first fluid chamber. The doubling of the slip speed would then lead to a power loss of 4 kW. The same applies to an increase in the engine torque. Because of the good cooling of the friction clutch and its friction surfaces which can be realized according to the invention and because of the resulting good ability to manage high power losses, it is possible to design the clutch device and its friction clutch for a wide variety of different requirements.

The clutch device can be designed as a motor vehicle starting element which serves to match a drive speed with a driven speed when the motor vehicle is started. Particularly when the clutch device according to the invention is to be used for this purpose, it is advisable to provide no torque transmission connection between the drive side and the driven side of the clutch device other than the friction clutch.

In general, it is suggested that the clutch device according to the invention is constructed as a separate constructional unit which can be installed in a drivetrain of a motor vehicle between a drive unit and a transmission.

The invention is further directed especially to a clutch device which can be installed in a drivetrain of a motor vehicle between a drive unit and a transmission, with a housing containing a first fluid chamber and a second fluid chamber, and with a piston of a friction clutch, which piston separates the first and second fluid chamber from one another and is axially movable with respect to a housing axis, wherein the friction clutch can be actuated by the application of a fluid pressure difference between the first fluid chamber and the second fluid chamber, wherein the friction surfaces of the friction clutch are arranged in the first fluid chamber, and serves to produce a torque transmission connection between an input side and an output side of the clutch device, wherein fluid can be supplied to the first fluid chamber and fluid can be removed from the first fluid chamber independently from the fluid pressure in the second fluid chamber in order to conduct frictional heat away from the friction clutch and its friction surfaces. It is suggested, according to the invention, for this clutch device, which is preferably constructed as a separate constructional unit, that the clutch device has essentially no other torque transmission connection between the drive side and the driven side of the clutch device apart from the friction clutch.

As was already mentioned above with respect to the clutch device according to the first aspect of the invention, a clutch device of this kind can be used particularly advantageously as a motor vehicle starting element which serves to adjust or match a drive speed and a driven speed when starting the motor vehicle. The clutch device according to the invention makes it possible to adjust the starting behavior of the system in a specific manner by applying a corresponding fluid differential pressure between the first and second fluid chambers. The starting behavior of the system can therefore be adjusted, for example, for cold starting as well as for sporty or comfortable starting, etc.

In other respects, the clutch device according to the second aspect of the invention can be constructed like the above-mentioned clutch device according to the first aspect of the invention; with respect to a high durability of the clutch device, a minimum fluid quantity above all should be adjustable by means of a fluid circuit passing through the first fluid chamber, this minimum fluid quantity flowing through the fluid passages associated with the friction surfaces.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
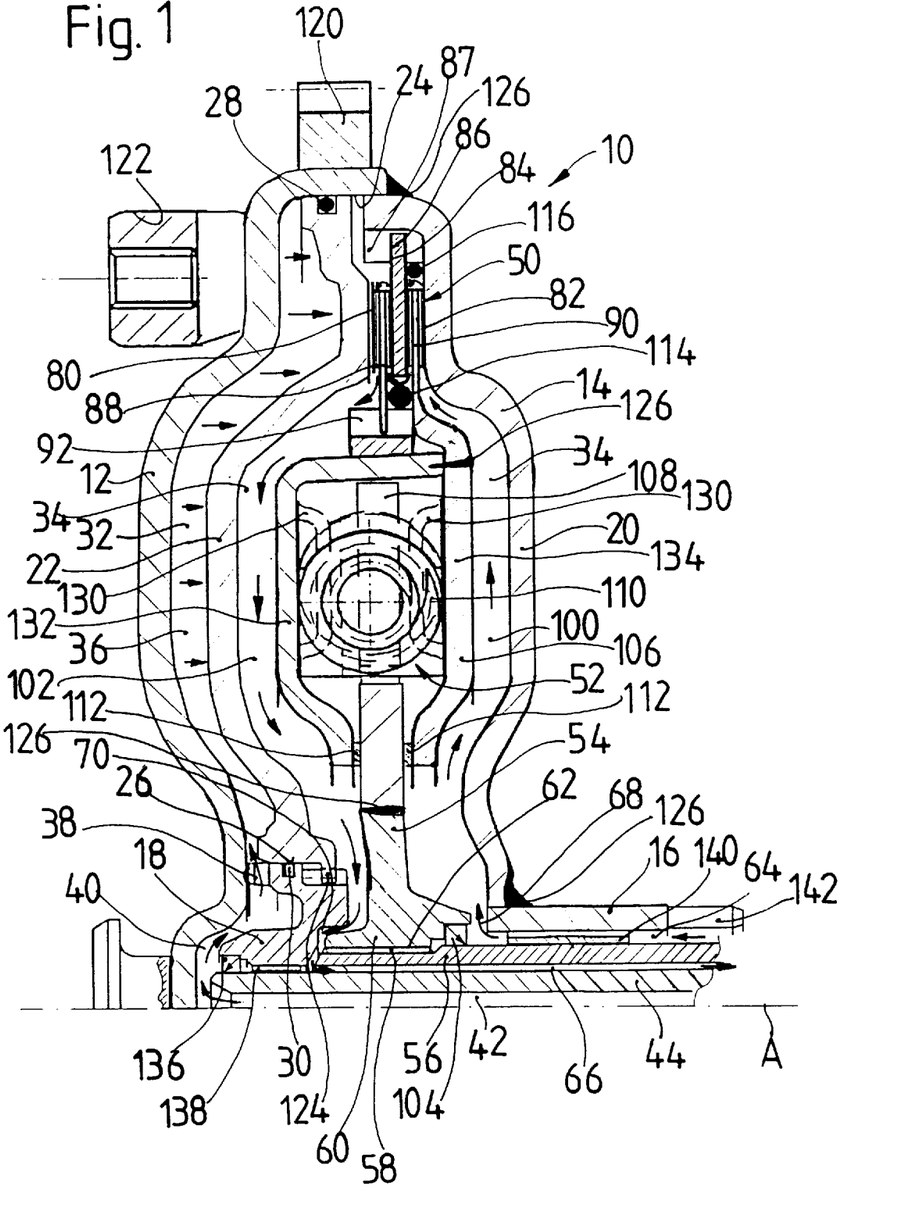
FIG. 1 shows a section through a clutch device according to the invention which is constructed as a starting element in accordance with a first embodiment form with the section plane extending through a rotational axis of a housing of the clutch device.

The clutch device 10 according to FIG. 1 comprises a housing 20 which is formed of two housing shells 12 and 14, a housing hub 16 and a supporting ring 18 and in which a ring piston 22 is displaceable in the direction of an axis A at a radial outer internal circumferential surface 24 of the left-hand housing shell 12 and an outer circumference 26 of the supporting ring 18 which is arranged in a radial inner area at the inside of the left-hand housing shell 12 so as to be fixed with respect to rotation relative to it, wherein the ring piston is guided so as to be sealed by means of seal rings 28, 30. The ring piston 22 divides an interior space 32 of the housing 20 into a first fluid chamber 34 which is defined chiefly by the right-hand housing shell 14 and the piston 22 and a second fluid chamber 36 which is defined by the left-hand housing shell 12, the supporting ring 18 and the piston 22. The second fluid chamber 36 is in a fluid flow connection with a fluid pressure source, particularly a hydraulic oil source, via fluid channels 38, 40 formed in the supporting ring 18 and between the supporting ring 18 and the left-hand housing shell 12 and via an axially extending fluid channel 42 in order to be able to displace the piston 22 axially for actuation of a friction clutch 50 by applying a difference in fluid pressure between the first fluid chamber and the second fluid chamber.

A driven wheel 54 having a torsional vibration damper 52 is arranged in the first fluid chamber 34 so as to be rotatable relative to the housing 20. The driven wheel 54 is mounted on a driven shaft 56 constructed as a hollow shaft by means of an internal toothing 58 at a hub 60 of the driven wheel 54 and an outer toothing 62 of the driven shaft 56 so as to be fixed with respect to rotation but axially displaceable. The driven shaft 56 extends in an annular space between the housing hub 16 and the fluid guide shaft 44 and divides this annular space into a first fluid annular channel 64 between the housing hub 16 and the driven shaft 56 and a second annular channel 66 between the driven shaft 56 and the fluid guide shaft 44. The first annular channel 64 communicates via an annular passageway 68 between the driven wheel hub 60 and the inner end of the housing hub 16 with the first fluid chamber on the right-hand side of the driven wheel 54 and the second annular channel 66 communicates with the first fluid chamber 34 on the left-hand side of the driven wheel 54 via an annular passageway 70 between the supporting ring 18 and the driven wheel hub 60, wherein the two annular channels 64 and 66 can be connected to a fluid supply, especially an oil supply, in order to supply fluid to the first fluid chamber 34 and to guide off fluid from the first fluid chamber 34.

The friction clutch 50 has a laminated stack 84 between a friction surface 80 of the piston 22 and a friction surface 82 of the right-hand housing shell 14 with an outer lamination 86 which is held by an external toothing at a toothing 87 of the right-hand housing shell 20 so as to be fixed with respect to rotation but axially displaceable relative to the latter and with two inner laminations 88 and 90 which carry friction facings on both sides; the internal lamination 88 is arranged between the friction surface 80 of the piston 22 and the outer lamination 86, and inner lamination 90 is arranged between the outer lamination 86 and the friction surface 82 of the right-hand housing shell 14. The inner lamination 88 is arranged by means of an internal toothing at an external toothing 92 on the radial outside of the driven wheel 54 so as to be fixed with respect to rotation but axially displaceable relative to it. The other internal lamination 90 is fixedly and essentially rigidly arranged at the driven wheel 54, so that the axial position of this internal lamination 90 which is dependent on the actuation state of the friction clutch 50 determines the axial position of the driven wheel 54 on the driven shaft 56. Axial bearings for guiding the driven wheel 54 are therefore not required.

A plurality of grooves (facing grooves) extending in the radial direction are provided in the friction facings of the inner laminations 88 and 90; these grooves form fluid passages between friction surfaces which can be brought into frictional engagement with one another and which are also open when the friction clutch is engaged, that is, in case of frictional engagement between the friction surfaces of the piston 22, housing shell 14 and laminations 86, 88, 90, and produce a fluid through-flow connection between a fluid chamber area 100 to the right of the driven wheel 54 which communicates with the annular channel 64 via the annular passage 68 and a fluid chamber area 102 to the left of the driven wheel 54 which is connected to the second annular channel 66 via the annular passage 70. Otherwise, there is essentially no fluid connection between the two fluid chamber areas 100 and 102 for which corresponding sealing means are provided (for example, a seal arrangement 104 between the driven wheel hub 60 and the driven shaft 56), and the torsional vibration damper 52 is formed with a substantially closed spring cage 106 for spring elements 110 acting between the spring cage 106 and a driver wheel portion 108 of the driver wheel 54. Ring elements 112 which simultaneously serve as sealing rings and as friction rings of a friction device damping torsional vibrations act between the spring cage 106, which has the external toothing 92 for the inner lamination 88 and which is constructed in one piece with the other inner lamination 90, and the driver wheel 108.

The facing grooves in the friction facings of the inner laminations form four fluid passage groups which are offset axially relative to one another, namely, a group of fluid passages between the inner lamination 90 and the adjacent friction surface 82 of the right-hand housing shell 14, another group of fluid passages between the inner lamination 90 and the outer lamination 86, and another group of fluid passages between the outer lamination 86 and the axially displaceable inner lamination 88 and, finally, a group of fluid passages between the inner lamination 88 and the friction surface 80 of the piston 22. These fluid passages are connected in series by groups, so that fluid supplied to the fluid chamber area 100, for example, first flows between the inner lamination 90 and the friction surface 82, then between the inner lamination 90 and the outer lamination 86, then between the outer lamination 86 and the inner lamination 88 and, finally, between the inner lamination 88 and the friction surface 80 of the piston 22. In order to protect the external toothing 92 for the inner lamination 88 and the internal toothing 87 of the right-hand housing shell 14 from fluid which bypasses the fluid passages of the above-mentioned fluid passage groups, sealing rings 114 and 116 can be arranged between the inner laminations radially outside of the external toothing 92 and between the outer lamination 86 and the right-hand housing shell 14 radially inside of the internal toothing 87 as is indicated in the embodiment example shown herein; the sealing rings 114 and 116 act in a sealing manner between the aforementioned components in every case when the clutch is at least partly engaged (slip operation) and accordingly ensure that the fluid supplied to the friction surfaces essentially flows entirely through the fluid passages. The teeth of the laminations and the teeth of the driven wheel or of the right-hand housing shell 14 can also be adapted to one another in such a way that a sufficient flow of fluid through the fluid passages is ensured even without special sealing measures, for example, in that a fluid flow path bypassing the fluid passages through the teeth has a sufficiently large through-flow resistance which causes a fluid flow through the fluid passages that is sufficient for cooling.

In this connection, it should also be noted that the one-piece construction of the right-hand inner lamination 90 with the spring cage 106 makes it possible in a particularly simple manner that substantially all of the fluid supplied to the right-hand fluid chamber area 100 via the first fluid channel 64 flows through the aforementioned fluid passages formed by the friction facing grooves before flowing out of the first fluid chamber 34 via the left-hand fluid chamber area 102 and then via the second annular channel 66. The fluid flow direction is indicated by arrows in FIG. 1. The same is true when, in contrast to the arrow directions, a fluid flow is provided in the opposite direction through the first fluid chamber 34. It is important that the fluid circuit which can be guided through the first fluid chamber 34 in the described manner is substantially completely independent from the actuation state of the friction clutch 50, that is, from the fluid pressure in the second fluid chamber 36, so that the cooling of the friction clutch 50 is adjustable independently from the actuation state of the friction clutch by a corresponding selection of the fluid flow through the first fluid chamber 36. Any changes in the through-flow resistance through the fluid passages due to flow cross sections of the fluid passages which change for different actuation states of the friction clutch can easily be taken into account by adjusting to a minimum through-flow through the fluid passages when the clutch is fully engaged or at maximum through-flow resistance of the fluid passages.

If the fluid circuit flowing for the purpose of cooling the friction clutch passed through the second fluid chamber 36, this would result in a certain back-pressure which would increase with the volume flow and would limit the ability of the friction clutch to transmit torque. Further, in a construction of the clutch device of the type mentioned above, only a control of the friction clutch with low fluid pressure and consequently a comparatively small fluid flow through the friction surfaces would be effected precisely when, in the case of a regulated/controlled clutch operation, possibly at high slip speeds, extensive power loss occurs and consequently when extensive heat must be guided off, which would result in poor cooling. Due to the control, according to the invention, of the first fluid chamber 34 with a cooling flow of fluid through the fluid passages substantially independently from the actuation state of the friction clutch 50, the cooling of the friction clutch can always meet requirements because it is carried out independent from the actuation of the friction clutch. If power loss no longer occurs in certain operating states, the cooling can also be completely switched off, so that increased transmission efficiencies or—in general terms—energy savings can be achieved.

A few structural details of the starting element shown herein will be mentioned. A starter ring gear 120 is arranged at the left-hand housing shell 12 on the radial outside so as to be fixed with respect to rotation relative to it. Further, the left-hand housing shell 12 has fastening projections 122 which extend in the axial direction and which serve to fasten a star-shaped flexible plate (so-called flex-plate) which is used for coupling the housing 20 with a crankshaft of an internal combustion engine so as to be fixed with respect to rotation relative to it.

The ring piston 22 is arranged so as to be fixed with respect to rotation relative to the housing 20 by means of teeth 124 acting between the piston 22 and the supporting ring 18. Different welds between components or the clutch device are designated in FIG. 1 by 126.

It should also be noted with respect to the construction of the torsional vibration damper 52 that the closed construction of the spring cage 106 is achieved in that the latter has no windows in the external cover plates, but rather has axial indentations 130 of a left-hand and right-hand cover plate 132 and 134, neither of which has any openings, which indentations cooperate with the spring elements 10, so that the interior of the torsional vibration damper 52 between the cover plates in which the spring elements 110 are arranged in windows of the driver wheel 108 is substantially closed relative to the first fluid chamber 34.

It should be noted in addition that the fluid guide shaft 44 in the embodiment example shown herein does not have a torque transmitting function, but rather only serves to connect the second fluid chamber 36 to a fluid pressure source independent from the first fluid chamber 34. A seal 136 acting between the fluid guide shaft 44 and the supporting ring 18 is provided for sealing relative to the second annular channel 66. The fluid guide shaft 44 could be coupled via teeth with the supporting ring 18 so as to be fixed with respect to rotation relative to it, wherein this supporting ring 18 can also be referred to as an (inner) housing hub. In the shown embodiment example, the fluid guide shaft 44 is rotatably mounted by means of a sliding ring 138 in the supporting ring 18, so that a rotational connection between the fluid channel 42 and an associated fluid pressure source can be dispensed with.

Another sliding bearing 140 is provided between the housing hub 16 and the driven shaft 56 in the first annular channel 64 and has grooves enabling an axial flow of fluid. A corresponding sliding bearing 140 can also be provided between the driven hollow shaft 56 and the fluid guide shaft 44. For purposes of driving a fluid pump, especially an oil pump, by means of which a fluid circulation through the first fluid chamber 34 can be produced through the first annular channel 64 and the second annular channel 66, the housing hub 16 has axially extending teeth 142, known per se.

Figure 2:
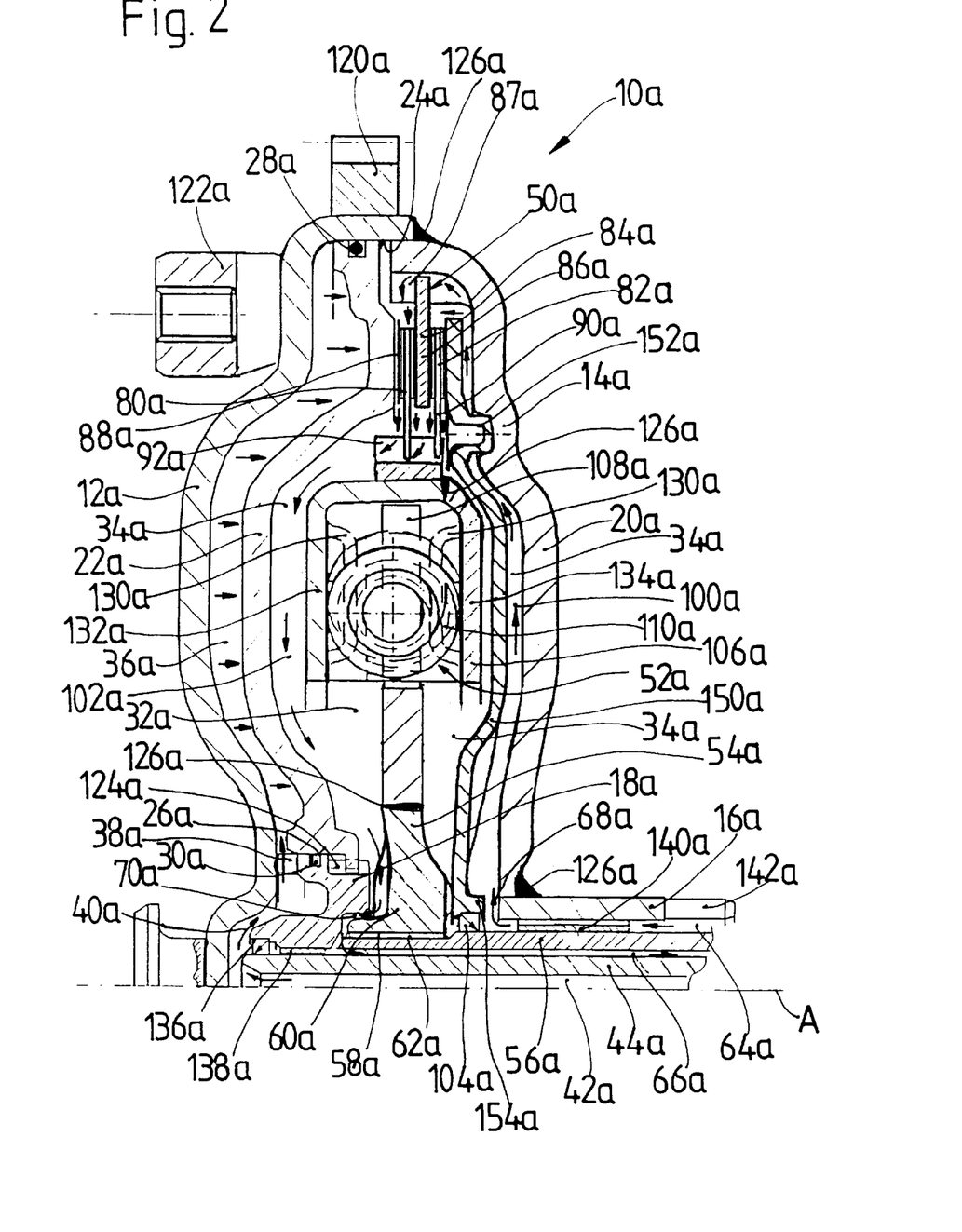
FIG. 2 shows a variant of the clutch device of FIG. 1 in a view corresponding to FIG. 1.

While in the embodiment example shown in FIG. 1 the driven wheel 54 having the driver wheel 108, spring cage 106 and inner laminations 88, 90 serves to divide the first fluid chamber 34 into a fluid supply area supplying fluid to the fluid passages of the friction clutch (fluid chamber area 100 in the embodiment example) and a fluid outlet area guiding fluid from these fluid passages (fluid chamber area 102 in the embodiment example), a separate intermediate wall 150a is provided in the embodiment example shown in FIG. 2 and is arranged between the right-hand housing shell 14a and the driven wheel 54a. In the description of the second embodiment example according to FIG. 2, identical reference numbers are used for identical or analogous components with the addition of a lowercase 'a' to denote the embodiment form. Only differences with respect to the first embodiment example according to FIG. 1 are discussed; in other respects, the description of the first embodiment example is referred to expressly.

The intermediate wall 150a which is likewise constructed in the shape of a shell is connected with the right-hand housing shell 14a so as to be fixed with respect to rotation relative to it, specifically, by means of positive-locking connection points 152a at which a projection which is shaped into the intermediate wall 150a engages in the manner of a rivet in a complementary cutout formed in the right-hand housing shell 14a. There is a plurality of such connection points 152a which are distributed so as to be evenly spaced in the circumferential direction. The intermediate wall 150a (similar to that shown in FIG. 2 radially inside the connection point 152a) is arranged at a distance from the inner side of the right-hand housing shell 14a between the connection points 152a arranged successively in the circumferential direction, so that the fluid chamber area 100a of the first fluid chamber 34a formed between the intermediate wall 150a and the right-hand housing shell 14a produces a connection between the first annular channel 64a and a radial outer area of the first fluid chamber radially outside of the inner laminations 88a, 90a, specifically, via the annular passage 68a between a hub portion 154a of the intermediate wall 150a and the housing 20a in the area of the inner end of the housing hub 16a. The hub 154a of the intermediate wall is guided by means of a sealing guide ring 104a on the driven shaft 56a so as to be rotatable relative to the latter, wherein stops which are formed in the intermediate wall 150a and which cooperate with stop faces of the housing in the area of the right-hand housing shell 14a and inner end of the housing hub 16a ensure that the intermediate wall 150a is positioned with respect to the right-hand housing shell 14a for constructing the annular passageway 68a and the right-hand fluid chamber area 100a.

The right-hand intermediate wall 150a can also easily be considered as a part of the housing 20a. In this case, the right-hand fluid chamber area 100a would be identified alternatively as a fluid channel arrangement of the housing supplying fluid to an area of the first fluid chamber located radially outside of the friction surfaces and (in the flow direction opposite to that pictured in the drawing) guiding fluid away from the latter.

In the embodiment example of FIG. 2, the fluid passages formed by the friction facing grooves are all connected parallel to one another. For this purpose, the inner toothing 87a of the housing is constructed in such a way with respect to the external toothing of the outer laminations 86a that fluid can flow in the axial direction from one side to the other side of the outer lamination 86a in a substantially unimpeded manner. The housing-side friction surface 82a is formed by a surface of the intermediate wall 150a which is fixed with respect to the housing.

The inner laminations 86a and 90a are both axially displaceable on the outer toothing 92a of the driven wheel 54a, wherein the external toothing 92a and the associated internal toothing of the inner laminations 88a, 90a are constructed in such a way with respect to one another that an essentially unimpeded through-flow of fluid is ensured, so that the flow resistance which is decisive for the through-flow of the fluid through the first fluid chamber 36a is determined primarily by the parallel-connected fluid passages and is therefore appreciably reduced compared with the series connection in FIG. 1.

The hub 60a of the driven wheel 54a is in turn axially displaceable and is arranged on the driven shaft 56a so as to be fixed with respect to rotation relative to it, but has only a comparatively small axial displacement play which is defined by axial stops of the intermediate wall hub 154a on the one hand and of the supporting ring 18a on the other hand. The axial stops are constructed with respect to the supporting ring 18a with impressed grooves or the like in order to ensure an unimpeded flow of fluid through the annular passageway 70a.

In the shown embodiment example, the torsional vibration damper is arranged completely in the fluid chamber area 102a serving as fluid outlet area (or alternatively fluid supply area), so that the spring cage 106a does not need to be sealed to prevent a "fluid short-circuit" and consequently opens radially inward in the shown embodiment example. Therefore, windows could also be provided in the cover plates as an alternative to the indentations 130a of the cover plates 132a, 134a for the spring elements 110a.

As in the embodiment example according to FIG. 1, the friction clutch 50a can be controlled or regulated by means of the piston 22a independent from the cooling fluid flow through the first fluid chamber 34a by means of controlling the pressure in the second fluid chamber 36a via the fluid channel 42a in the fluid guide shaft 44a, which is indicated in the drawing by the arrows symbolizing the pressure actuation of the piston 22a.

A substantial advantage of the clutch device which is shown in the drawing and which preferably serves as starting element is that the laminations of the friction clutch generate at most minimum drag torques by friction because the friction clutch with its friction surfaces is arranged entirely in a completely filled rotating body, namely, the housing 20 or 20a, and the fluid, especially oil, is carried along in the first fluid chamber during rotation of the housing about axis A. In the completely bypassed (engaged) state, the friction clutch works virtually without losses, since the friction which still occurs between the housing and laminations on the one hand and between the housing and the fluid on the other hand, as well as the friction between the housing and the air surrounding the housing, is negligible.

Another advantage of the clutch shown herein according to the embodiment examples consists in that when a high-performance torsional vibration damper is provided, this torsional vibration damper can be integrated with the clutch device with the arrangement of the friction clutch on the radial outside or—alternatively—on the radial inside of the torsional vibration damper, so that no additional axial installation space is required for the friction clutch.

Another advantage of the clutch device according to the invention consists in that the friction clutch of the clutch device can be cooled effectively and in a defined adjustable manner by means of the fluid (generally oil) flowing through the first fluid chamber 34 and 34a, so that heat losses can be guided away from the friction clutch and its friction surfaces with high efficiency and the friction clutch can consequently be highly loaded.

It should also be noted expressly that the clutch device according to the invention can be combined with a hydrodynamic circuit if desired (for example, for increasing torque). Particularly when the utilized transmissions, especially automatic transmissions, have a sufficiently large transmission spread, the torque conversion of a hydrodynamic torque converter no longer seems absolutely necessary. Therefore, many requirements can be met by a clutch device without a hydrodynamic circuit, especially when the friction clutch is operated in slip operation with regulated/ controlled slip, which is also possible for high power losses due to good cooling of the friction clutch. In the case of a slip-regulated/slip-controlled friction clutch, it also appears possible to dispense with a torsional vibration damper which is integrated in the clutch device or separate therefrom.

Figure 3:
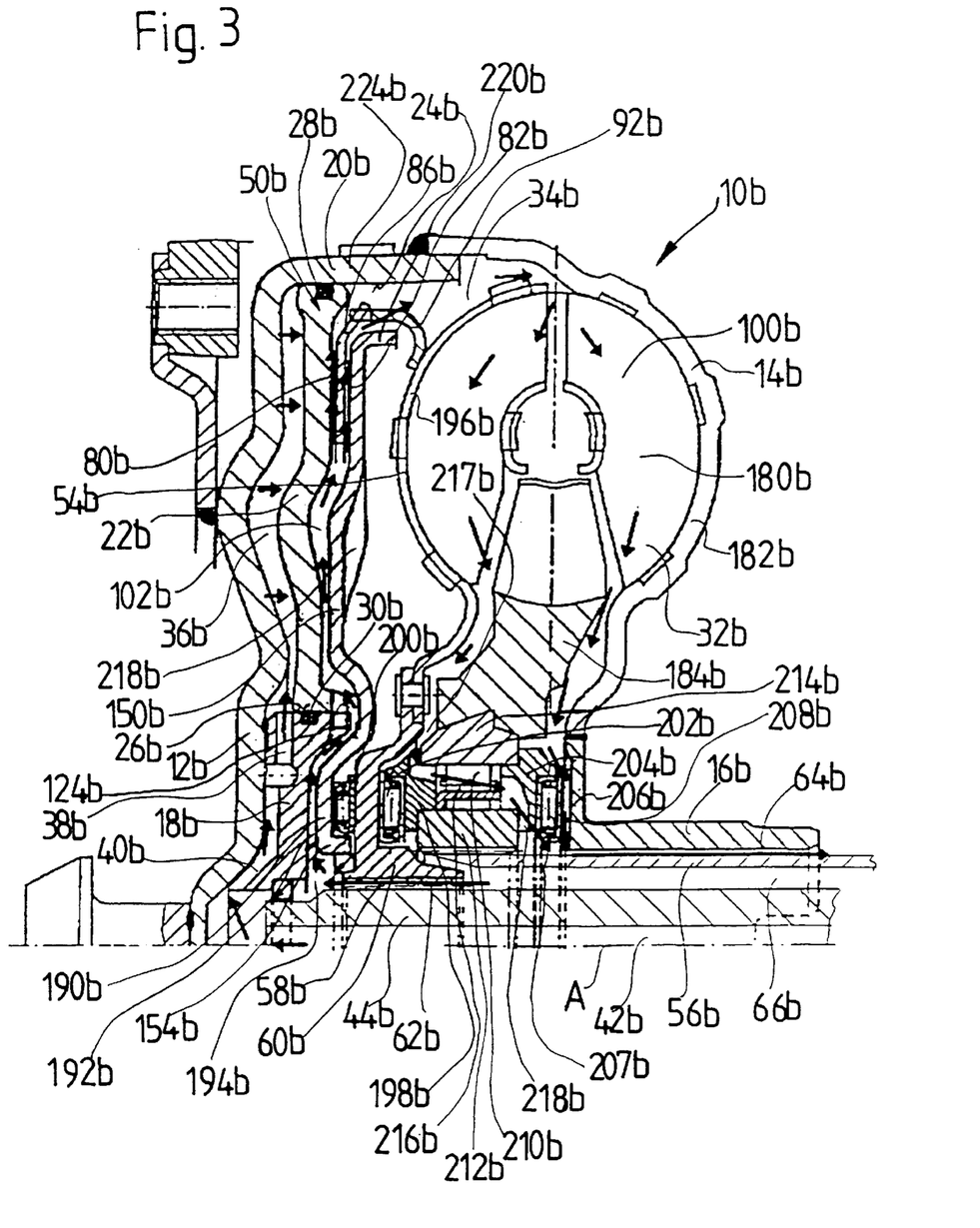
FIG. 3 shows a section through a clutch device according to the invention which is constructed as a torque converter with a lockup clutch in accordance with another embodiment form with the section plane through a rotational axis of a housing of the torque converter.

An example of a clutch device according to the invention in the form of a torque converter with a hydrodynamic circuit is shown in FIG. 3. In the description of the torque converter according to the invention, the same reference numbers are used for identical or analogous structural component parts with the addition of a lowercase 'b' and only the differences with respect to the embodiment examples according to FIGS. 1 and 2 are discussed; in other respects, the preceding description is referred to expressly.

The torque converter 10b has a first fluid chamber 34b and a second fluid chamber 36b, wherein the first fluid chamber 34b is divided by an intermediate wall 150b into a fluid chamber area 100b containing an impeller wheel 182b formed by a portion 14b of the housing 20b, a stator wheel 184b and a turbine wheel 54b, and into a fluid chamber area 102b formed between the intermediate wall 150b and the piston 22b. The intermediate wall 150b is arranged, for example, by welding (e.g., by resistance welding, especially capacitor discharge welding or laser welding), at a radial inner intermediate wall portion 190b at the supporting ring 18b leading to the piston 22b such that it is fixed with respect to rotation relative thereto and fixed axially, wherein radially extending fluid channels 192b which are formed, for example, by grooves (possibly interrupting the weld seam) in the supporting ring 18b are provided between the wall portion 190b and the supporting ring 18b. The fluid channels 192b produce a fluid flow connection between the fluid chamber area 102b and an annular channel 66b (second annular channel 66b) between the radial innermost shaft 44b serving as driven shaft for the turbine wheel 54b. For this purpose, teeth 58b and 62b which serve to couple the hub 60b of the turbine wheel with the driven shaft 44b so as to be fixed with respect to rotation relative to it are constructed in such a way that there is a fluid flow connection between the second annular channel 66b to the right of the turbine wheel hub 16b and an annular space 194b between the turbine wheel hub 16b and the supporting ring 185, wherein this annular space 194b is located on the radial inner side and the radially extending fluid channels 192b open into it, so that there is actually a fluid flow connection between the annular channel portion 66b to the right of the turbine wheel hub 60b and the fluid chamber area 102b.

In the shown embodiment example, the fluid chamber area 102b serves as a fluid supply area 102b to fluid passages which are constructed in the form of friction facing grooves in friction facings of an outer lamination 86b which is arranged between a friction surface 80b of the piston 22b and a friction surface 82b of the intermediate wall 150b. The outer lamination 86b is connected with the turbine wheel 54b serving as driven wheel for the friction clutch 50b so as to be fixed with respect to rotation relative to it by means of lamination carrying portions 92b arranged at a turbine blade portion 196b of the turbine wheel 54b. The fluid which is supplied via the fluid passages (friction facing grooves) of the outer lamination 86 to the fluid chamber area 100b which serves as fluid outlet area and which contains the turbine wheel 54b, impeller wheel 182b and stator wheel 184b flows through this fluid chamber area from the radial outside to the radial inside as is indicated by arrows in FIG. 3 and then flows through fluid passageways which will be described more fully and through an annular channel 64b (first annular channel 64b) between the housing hub 16b and the hollow shaft 56b serving as supporting shaft for the stator wheel 184b.

The turbine wheel 54b is supported axially by axial bearings 200b and 202b which act between the turbine wheel hub 60b on one side and the intermediate wall 150b or a pressure ring 198b filling a sliding bearing function for the stator wheel 184b on the other side. The stator wheel 184b is, in turn, supported axially via an axial bearing 207b acting between a pressure ring 204b, which performs the function of a sliding bearing for the stator 184b, and a radial inner portion 206b of the housing 20b which is formed in one piece with the housing hub 16b. Radially extending fluid channels 208b, for example, in the form of grooves, are constructed in the housing portion 206b; there is a fluid flow connection between the fluid chamber area 100b and the first annular channel 64b via the grooves. There is another fluid flow connection between the annular channel 64b and the fluid chamber area 100b via essentially axially extending through-flow passages 210b in a freewheel 216b acting between a freewheel inner ring 212b and a freewheel outer ring 214b, so that, as indicated by arrows in FIG. 3, in addition to the fluid outlet flow between the stator wheel and the supporting ring 204b on the one hand and the right-hand housing shell 14b and housing portion 206b on the other hand, there is another fluid outlet flow between the turbine wheel 54b and the stator wheel 184b which is guided radially inward to the first annular channel 64b via fluid passageways 217b extending between the freewheel outer ring 214b and the turbine wheel 54b and pressure ring 198b, fluid passageways 210b in the freewheel 216b, and passageways 218b formed between the freewheel inner ring 212b and the pressure ring 204b.

It is noted that the different fluid flow paths of the clutch device 10b should be sealed relative to one another as far as possible. For this purpose, the axial bearing 200b can be constructed essentially tight. Further, additional sealing measures can be taken as is shown by way of example in FIG. 3 by means of sealing rings between the left-hand axial end of the driven shaft 44b and the supporting ring 18b and between the turbine wheel hub 60b and hub 154b of the intermediate wall 150b. Further, teeth are constructed between the hollow shaft 56b serving as supporting shaft for the stator wheel 184b and the freewheel inner ring 212b so as to be as fluid-tight as possible, so that there is no fluid short-circuit between the first fluid annular channel 64b and the second fluid annular channel 66b. Alternatively or in addition to the fluid-tight construction of the teeth mentioned above, sealing arrangements such as sealing rings can act between the freewheel inner ring 212b and the supporting shaft 56b. Further, the fluid passageway area 217b is to be sealed relative to the second annular channel 66b, for which purpose the axial bearing 202b including the pressure ring 198b can be carried out in a sealed manner and/or can be provided with separate sealing means. In this regard, it is also important that a high through-flow is ensured between the turbine wheel hub 60b and the driven shaft 44b, for which purpose additional grooves can be provided in the turbine hub and/or driven shaft. By means of all of these steps, it is ensured that the fluid supplied via the fluid annular channel 66b is supplied essentially exclusively to the fluid supply area 102b and accordingly to the fluid passages allocated to the friction surfaces without substantial leakage flow bypassing the fluid passages.

Beyond this, the fluid circuit should be throttled as little as possible through the first fluid chamber, so that all fluid passages, fluid passageways and fluid channels offer the greatest possible effective fluid flow cross section to the fluid flowing in the fluid circuit through the first fluid chamber. This applies to the same extent to the part of the fluid circuit leading through the fluid supply area 102b to the fluid passages in the friction facings as well as to the part of the fluid circuit leading from these fluid passages through the fluid outlet area 100b and also for the fluid passageways 217b between the turbine wheel 54b and stator wheel 184b, the passageways 210b in the freewheel 216b, the passageways 218b between the freewheel inner ring 212b and pressure ring 204b and fluid channels 208b between the axial bearing 207b and housing portion 206b. Further, the axial bearing 207b can be constructed so as to be permeable to fluid, that is, so as not to be sealed. Further, the fluid channels 192b between the annular space 194b and the fluid supply area 102b should have the lower possible flow resistance.

Other structural details of the embodiment example can be gathered from the Figures without further explanations. Accordingly, as in the embodiment examples in FIGS. 1 and 2, the piston 22b is guided via a toothing 124b so as to be fixed with respect to relative rotation at the supporting ring 18b and therefore at the housing 20b. The intermediate wall 150b which can also be also appreciably thicker with respect to the axial thickness of the piston 22b and therefore more stable can be constructed with beads or stiffening ribs 218b for increased stiffness against axially acting forces in order to be able to support compressive forces exerted by the piston 22b in the axial direction. An annular, essentially axially extending bend 220b of the intermediate wall 150b in which the intermediate wall 150b terminates on the radial outer side also serves to stiffen the intermediate wall 150b. This bend 220b is arranged at a distance radially from an inner circumferential surface 24b of the left-hand housing shell 12b. The lamination carrying portions 92b extend through a radial area between the bend portion 120b and the inner circumferential surface 24b to the inner lamination 86b in order to support it at the turbine wheel 54b so as to be fixed with respect to rotation relative to the latter. With respect to the lamination carrying portions 200b, it should be mentioned in addition that these are offset relative to one another in the circumferential direction, so that fluid flowing through the fluid passages in the friction facings can flow past these lamination carrying portions 92b toward the radial outside.

It should be emphasized in addition that the fluid flow direction indicated by the arrows in FIG. 3 through the first fluid chamber 34b is not mandatory and consequently the opposite fluid flow direction can also be provided. This would have the advantage that a suction action of the rotating impeller wheel 182b would reinforce the fluid flow through the first fluid chamber 34b. On the other hand, the flow direction shown in FIG. 3 has the advantage that cooled fluid supplied by a fluid supply is first supplied to the fluid passages allocated to the friction surfaces, that is, the friction facing grooves in the embodiment example, prior to which it undergoes heating through the action of the hydrodynamic circuit 180b formed by the impeller wheel 182b, stator wheel 184b and turbine wheel 54b.

For purposes of a greater transmission cap ability, the friction clutch could also be constructed with a plurality of outer laminations supported, for example, (like lamination 86b) at the turbine wheel 54b and one or more inner laminations supported, for example, on the housing side which are arranged as laminated stacks between the piston 22b and the intermediate wall 150b.

The embodiment example shown in FIG. 3 has no torsional vibration damper arrangement. A torsional vibration damping, can be achieved by slipping operation of the friction clutch 50b. However, a torsional vibration damping arrangement could easily be integrated in the torque converter 10b, e.g., between the friction clutch and the driven shaft 44b, for example, in the form of a correspondingly constructed driven wheel arrangement which has the torsional vibration damping arrangement and which can be constructed integral with the turbine wheel.

In conclusion, the invention is directed to a clutch device, wherein a first fluid chamber and a second fluid chamber in the housing of the clutch device are separated by a piston which is movable by means of a difference in fluid pressure between the fluid chambers. The piston serves to actuate a friction clutch whose friction surfaces are arranged in the first fluid chamber. Fluid can be guided through the first fluid chamber independent from the fluid pressure prevailing in the second fluid chamber in order to guide frictional heat from the friction clutch and its friction surfaces. For this purpose, fluid passages are provided through which fluid associated with the first fluid chamber can flow, these fluid passages being allocated to the friction surfaces. It is suggested that a minimum fluid quantity flowing through the fluid passages is adjustable by means of the fluid quantity flowing through the first fluid chamber, for which purpose the maximum fluid quantity is in a fixed relationship to the fluid quantity introduced into the first fluid chamber or removed from this first fluid chamber.

The invention is not limited by the embodiments described above which are presented as examples only but can be modified in various ways within the scope of protection defined by the appended patent claims.

I claim:

1. A clutch device comprising: a housing containing a first fluid chamber and a second fluid chamber; a piston of a friction clutch arranged in the housing so as to separate the first fluid chamber from the second fluid chamber, and is axially movable with respect to a housing axis, the friction clutch being actuable by applying a pressure difference between fluid in the first fluid chamber and the second fluid chamber, the friction clutch having friction surfaces arranged in the first fluid chamber, wherein fluid can be supplied to the first fluid chamber and fluid can be removed from the first fluid chamber independent from the fluid pressure in the second fluid chamber in order to conduct frictional heat away from the friction clutch and its friction surfaces; and fluid passages allocated to the friction surfaces through which fluid allocated to the first fluid chamber can flow so that, when a fluid circulation is produced through the first fluid chamber by feeding an amount of fluid into the first fluid chamber and letting a corresponding amount of fluid out of the first fluid chamber, a minimum amount of fluid flows through the fluid passages allocated to the friction surfaces, which fluid passages are in a fixed relationship with the amount of fluid introduced into and removed from the first fluid chamber, the minimum fluid quantity being at least 30% of the fluid quantity supplied to or removed from the first fluid chamber.

2. A clutch device according to claim 1, wherein the minimum fluid quantity is 50%.

3. A clutch device according to claim 2, wherein the minimum fluid quantity is 70%.

4. A clutch device according to claim 3, wherein the minimum fluid quantity is 90%.

5. A clutch device according to claim 1, wherein the fluid circulation passes substantially completely through the fluid passages.

6. A clutch device according to claim 1, wherein at least two groups of fluid passages are provided which are connected in parallel within a group and which are connected in series from one group to another.

7. A clutch device according to claim 6, wherein fluid passages which are associated with friction surfaces that can be brought into a frictional engagement with one another belong to one group.

8. A clutch device according to claim 1, wherein at least one of at least a part of the fluid passages is formed by friction facing grooves, at least a part of the fluid passages is formed by grooves in at least one lamination of the friction clutch, and at least a part of the fluid passages is formed by channels in laminations of the friction clutch which have at least one smooth friction surface.

9. A clutch device according to claim 1, and further comprising a torque transmission wheel mounted so as to be rotatable relative to the housing and provided in the first fluid chamber and in a torque-transmitting connection with a torque transmission shaft, the torque transmission wheel being couplable with the housing via the friction clutch in order to produce a torque transmission connection between a drive side and a driven side of the clutch device, and a torsional vibration damper arrangement integrated in the torque transmission wheel, the torsional vibration damper arrangement includes a damper cage constructed as a substantially closed cage which receives at least one torsional spring element.

10. A clutch device according to claim 1, and further comprising an intermediate wall provided in the first fluid chamber so as to divide the first fluid chamber into two fluid chamber areas which communicate via the fluid passages so as to permit a flow of fluid, and, when the fluid circulation is produced, one of the fluid chamber areas serves as a fluid supply area supplying fluid to the fluid passages and another serves as a fluid outlet area which guides fluid out of the fluid passages.

11. A clutch device according to claim 10, wherein the intermediate wall is at least one of connected with the housing so as to be fixed with respect to rotation relative to it and is axially secured to the housing.

12. A clutch device according to claim 1, and further comprising means for protecting a connection area between at least one lamination of the friction clutch and an associated lamination carrier against a substantial flow of fluid bypassing the fluid passages.

13. A clutch device according to claim 12, wherein the protecting means includes at least one sealing ring provided one of between two laminations and between a lamination and a surface of one of the housing and piston located opposite to the lamination.

14. A clutch device according to claim 1, and further comprising a torque transmission wheel mounted so as to be rotatable relative to the housing and provided in the first fluid chamber and in a torque-transmitting connection with a torque transmission shaft, the torque transmission wheel being couplable with the housing via the friction clutch in order to produce a torque transmission connection between a drive side and a driven side of the clutch device, the torque transmission wheel having a lamination carrying portion for at least one lamination, a lamination being arranged at the lamination carrying portion so as to be fixed with respect to axial displacement so that the connection area between the lamination and the lamination carrying portion is protected against a substantial flow of fluid bypassing the fluid passages.

15. A clutch device according to claim 1, and further comprising a torque transmission wheel mounted so as to be rotatable relative to the housing and provided in the first fluid chamber and in a torque-transmitting connection with a torque transmission shaft, the torque transmission wheel being couplable with the housing via the friction clutch in order to produce a torque transmission connection between a drive side and a driven side of the clutch device, and a hydrodynamic circuit as a further torque transmission connection between a drive side and a driven side of the clutch device, a turbine wheel associated with the torque transmission wheel, an impeller wheel and a stator wheel, the turbine wheel, together with the impeller wheel and the stator wheel forming the hydrodynamic circuit.

16. A clutch device according to claim 15, and further comprising an intermediate wall provided in the first fluid chamber so as to divide the first fluid chamber into two fluid chamber areas which communicate via the fluid passages so as to permit a flow of fluid, and, when the fluid circulation is produced, one of the fluid chamber areas serves as a fluid supply area supplying fluid to the fluid passages and another serves as a fluid outlet area which guides fluid out of the fluid passages, the intermediate wall being arranged axially between the torque transmission wheel and the piston wherein, the intermediate wall is connected in a radial inner area with a radial inner housing portion for common rotation with the housing so as to be fixed with respect to rotation relative to it, a fluid channel arrangement being provided at least one of in the housing portion, between the housing portion and the intermediate wall and in a hub portion of the intermediate wall, so that via the fluid channel arrangement, a fluid chamber area of the two fluid chamber areas which is defined by the piston and the intermediate wall and which serves as a fluid inlet area is connectable to an axially extending fluid channel arrangement which is connectable to a fluid source.

17. A clutch device according to claim 15, and further comprising an intermediate wall provided in the first fluid chamber so as to divide the first fluid chamber into two fluid chamber areas which communicate via the fluid passages so as to permit a flow of fluid, and, when the fluid circulation is produced, one of the fluid chamber areas serves as a fluid supply area supplying fluid to the fluid passages and another serves as a fluid outlet area which guides fluid out of the fluid passages, the intermediate wall being arranged axially between the torque transmission wheel and the piston, wherein the intermediate wall has a radially outer circumference at a radial distance from a radially outer circumferential wall portion of the housing, wherein at least one driven-side lamination arranged axially between the piston and the intermediate wall is held in a radial area of the first fluid chamber between the outer circumference and the circumferential wall portion in a torque transmission connection with the driven side of the clutch device the at least one driven-side lamination being held by at least one lamination carrying portion of the transmission wheel.

18. A clutch device comprising: a housing containing a first fluid chamber and a second fluid chamber; a piston of a friction clutch arranged in the housing so as to separate the first fluid chamber from the second fluid chamber, and is axially movable with respect to a housing axis, the friction clutch being actuable by applying a pressure difference between fluid in the first fluid chamber and the second fluid chamber, the friction clutch having friction surfaces arranged in the first fluid chamber, wherein fluid can be supplied to the first fluid chamber and fluid can be removed from the first fluid chamber independent from the fluid pressure in the second fluid chamber in order to conduct frictional heat away from the friction clutch and its friction surfaces; fluid passages allocated to the friction surfaces through which fluid allocated to the first fluid chamber can flow so that, when a fluid circulation is produced through the first fluid chamber by feeding an amount of fluid into the first fluid chamber and letting a corresponding amount of fluid out of the first fluid chamber, a minimum amount of fluid flows through the fluid passages allocated to the friction surfaces, which fluid passages are in a fixed relationship with the amount of fluid introduced into and removed from the first fluid chamber; and a torsional vibration damper arrangement which includes a damper cage constructed as a substantially closed cage which receives at least one torsional spring element.

19. A clutch device comprising: a housing containing a first fluid chamber and a second fluid chamber; a piston of a friction clutch arranged in the housing so as to separate the first fluid chamber from the second fluid chamber, and is axially movable with respect to a housing axis, the friction clutch being actuable by applying a pressure difference between fluid in the first fluid chamber and the second fluid chamber, the friction clutch having friction surfaces arranged in the first fluid chamber, wherein fluid can be supplied to the first fluid chamber and fluid can be removed from the first fluid chamber independent from the fluid pressure in the second fluid chamber in order to conduct frictional heat away from the friction clutch and its friction surfaces; fluid passages allocated to the friction surfaces through which fluid allocated to the first fluid chamber can flow so that, when a fluid circulation is produced through the first fluid chamber by feeding an amount of fluid into the first fluid chamber and letting a corresponding amount of fluid out of the first fluid chamber, a minimum amount of fluid flows through the fluid passages allocated to the friction surfaces, which fluid passages are in a fixed relationship with the amount of fluid introduced into and removed from the first fluid chamber; and an intermediate wall provided in the first fluid chamber so as to divide the first fluid chamber into two fluid chamber areas which communicate via the fluid passages so as to permit a flow of fluid, and, when the fluid circulation is produced, one of the fluid chamber areas serves as a fluid supply area supplying fluid to the fluid passages and another serves as a fluid outlet area which guides fluid out of the fluid passages.

20. A clutch device comprising: a housing containing a first fluid chamber and a second fluid chamber; a piston of a friction clutch arranged in the housing so as to separate the first fluid chamber from the second fluid chamber, and is axially movable with respect to a housing axis, the friction clutch being actuable by applying a pressure difference between fluid in the first fluid chamber and the second fluid chamber, the friction clutch having friction surfaces arranged in the first fluid chamber, wherein fluid can be supplied to the first fluid chamber and fluid can be removed from the first fluid chamber independent from the fluid pressure in the second fluid chamber in order to conduct frictional heat away from the friction clutch and its friction surfaces; fluid passages allocated to the friction surfaces through which fluid allocated to the first fluid chamber can flow so that, when a fluid circulation is produced through the first fluid chamber by feeding an amount of fluid into the first fluid chamber and letting a corresponding amount of fluid out of the first fluid chamber, a minimum amount of fluid flows through the fluid passages allocated to the friction surfaces, which fluid passages are in a fixed relationship with the amount of fluid introduced into and removed from the first fluid chamber; a torque transmission wheel mounted so as to be rotatable relative to the housing and provided in the first fluid chamber and in a torque-transmitting connection with a torque transmission shaft, the torque transmission wheel being couplable with the housing via the friction clutch in order to produce a torque transmission connection between a drive side and a driven side of the clutch device; a hydrodynamic circuit as a further torque transmission connection between the drive side and the driven side of the clutch device; and an intermediate wall provided in the first fluid chamber so as to divide the first fluid chamber into two fluid chamber areas which communicate via the fluid passages so as to permit a flow of fluid, and, when the fluid circulation is produced, one of the fluid chamber area serves as a fluid supply area supplying fluid to the fluid passages and another serves as a fluid outlet area which guides fluid out of the fluid passages, the intermediate wall being arranged axially between the torque transmission wheel and the piston.

* * * * *